Oct. 17, 1961 W. R. AIKEN 3,005,196
THREE DIMENSIONAL RADAR INDICATOR
Filed March 27, 1956 2 Sheets-Sheet 1
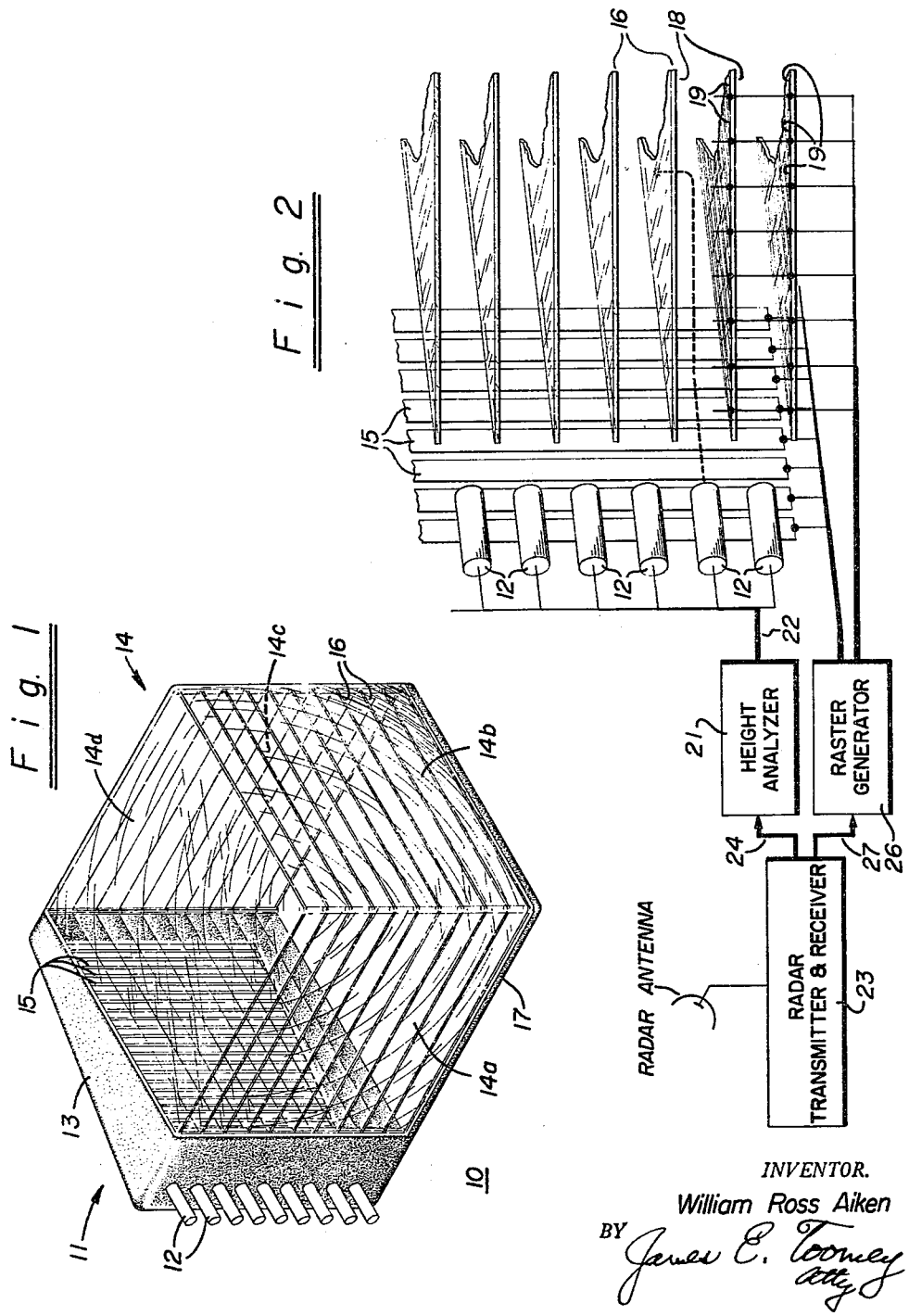
INVENTOR.
William Ross Aiken
BY James E. Toomey
atty

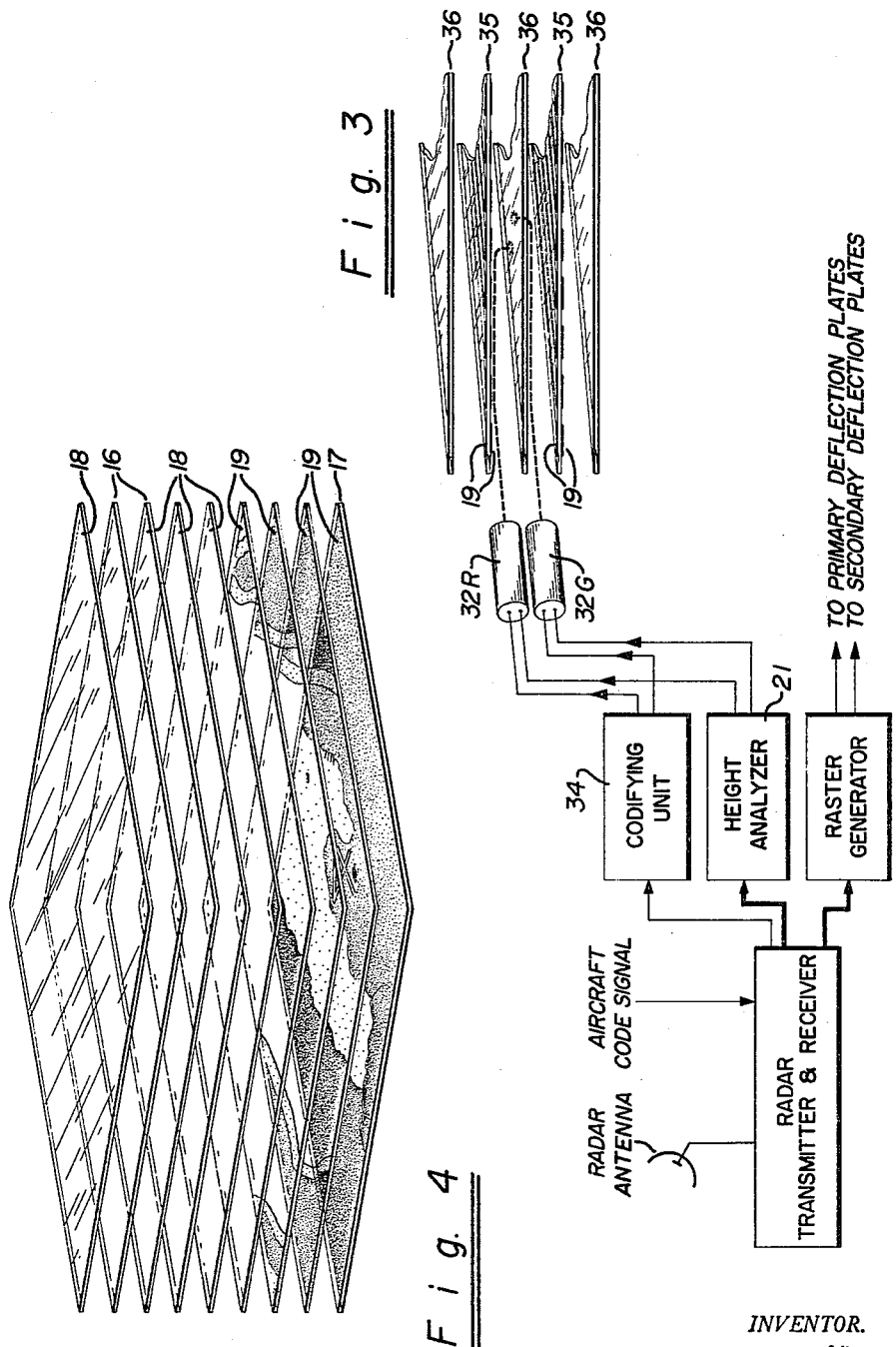

United States Patent Office 3,005,196
Patented Oct. 17, 1961

3,005,196
THREE DIMENSIONAL RADAR INDICATOR
William Ross Aiken, Los Altos, Calif., assignor, by mesne assignments, to Kaiser Industries Corporation, a corporation of Nevada
Filed Mar. 27, 1956, Ser. No. 574,220
11 Claims. (Cl. 343—7.9)

This invention relates to an electronic space discharge device and, more particularly, to a visual display device for simultaneously giving information in more than one plane.

At the present time, there is a need in both commercial and military aviation for a display device which will illustrate in three-dimension the position of a multitude of aircraft in the sky. In addition, there is also a large field of use for other three-dimensional display systems, including the home television field.

It is now obvious that due to the great increase in commercial air travel, a serious problem of traffic control has arisen at all major airports. Particularly in bad weather, it is necessary for the control tower operators and the operators of the ground controlled approach system to, at any one instant, be able to visualize and know precisely at what altitudes, in addition to bearings, the landing aircraft are circling the airfield. In a landing pattern, the various aircraft are directed to maintain certain specified altitudes and, until now, there has been no radar display device capable of giving this information instantaneously and in three-dimension. With the advent of jet airliners whose fuel consumption will be several times that of conventional piston-powered aircraft, the problem of expeditiously handling aircraft waiting for landing will be even more acute and there is a need in the field therefore for an improved aircraft display system for use in control tower stations. It is a particular object of the invention to provide a novel three-dimensional device which permits correlation of the relative positions and altitudes of aircraft in a given vicinity or volume, and particularly to a device of such type which includes a display arrangement in which the aircraft in the different altitude ranges are readily and rapidly detected.

In the more conventional arrangements which are now employed in the field to display radar information for traffic control purposes, several control operators are assigned to maintain a continuously changing greasepencil plot of the air traffic conditions. In the most popular embodiment, the plan position is pencilled in on a plastic overlay with additional information, such as altitude, represented by symbols. Such arrangement is, of course, extremely susceptible to the introduction of human error and requires the use of extremely competent operating personnel. The dangers and shortcomings of such arrangement are, of course, obvious, and a feature of the present invention is the manner in which a plurality of novel solid surface transparent plate members stacked in a layered arrangement effect a clear and rapidly readable display of the altitude of the aircraft in the vicinity of the display device.

A further feature of the present arrangement is the manner in which an increased number of aircraft may be safely controlled by a single control tower. That is, during the periods of poor visibility conditions in the known installations, each aircraft is directed to maintain a specified altitude over the control area until given permission to land, or is instructed to proceed to a new altitude. Under a typical situation each plane may be stacked at altitude intervals of 1,000 feet. Since known radar display devices do not enable the ground control operator to observe the relative location, including altitude of each of the planes, the operator is thus normally limited to assigning only one aircraft to each altitude layer. Furthermore, the traffic control operator, after assignment of an altitude for each plane cannot readily determine whether his instructions have been obeyed, or whether a misunderstanding may have occurred. Further, with present radar display devices, which are incapable of simultaneously showing the altitude of each plane and are limited to a showing of the plurality of "pips" on a single planar display surface, it is impossible for the control tower operator to quickly determine an open path through the maze of stacked aircraft for an emergency landing.

An additional shortcoming in present known arrangements is the difficulty with which a "lost" plane may be located and directed to a safe operating position. Under the present known systems in which a radarscope is utilized, the tower requests the pilot to note his heading and the tower operator observes on the scope those planes which appear to be going in such direction. It is apparent, however, that if more than one plane is going in the direction indicated, it is often impossible for the control tower operator to identify which of the dots on the target represent the lost aircraft without requesting the aircraft to perform certain turning maneuvers.

Ostensibly, using known systems a control operator must mentally coordinate many factors in attempting to keep the aircraft in orderly, adequately spaced positions, and such requirement in addition to introducing the possibility of human error necessarily limits the volume of traffic which may be handled and represents an important limitation in maximum achievable safety.

It is a particular object of the invention, therefore, to provide a three-dimensional display device which is operable to display discrete sets of information on each of a plurality of solid surface display targets which are arranged in juxtaposed relation for concurrent viewing, different targets displaying different discrete information sets, whereby an operator may readily compare the relative positions of certain objects, and particularly aircraft, in a three-dimensional structure.

In the field of military aircraft, most of which are already jet-powered and have a short fuel reserve, it is also necessary to quickly direct the landing aircraft and, in addition, to be able to distinguish between enemy and friendly aircraft in a pattern above or surrounding a military base.

It is a further specific object of the present invention to provide a display medium which is operable to display such information in a three-dimensional showing, and particularly to display the friend and foe targets in different colors to permit ready identification thereof.

It is a further specific object of the invention to display the physical barriers in the vicinity of the control tower which may endanger the aircraft, and to further display the aircraft position in a predetermined different color whenever the aircraft approaches a zone which lies within a given distance of such barrier.

The above invention and further objects, features and advantages thereof will best be understood by reference to the specification tube in connection with the specification and accompanying drawings in which:

FIGURE 1 is a perspective view of one embodiment of the invention,

FIGURE 2 sets forth a detailed cross-sectional view of a portion of the display device of FIGURE 1 and control circuitry for the deflection plates and the associated electron guns employed in the structure of the invention, FIGURE 3 is a cross-sectional view of an embodiment of the invention utilizing a two-color visual presentation of the discrete information sets which are coupled thereto for display purposes, and FIGURE 4 is an embodiment of the invention utilizing a polychrome phosphor field together with a permanent background display to show geographical obstacles.

*General description*

The general description of the structure and operation of the instant invention is most easily explained in terms of the Aiken-type tube which forms the basis of the instant invention, and which basically comprises a flat cathode-ray tube in which an electron beam is delivered adjacent and parallel to the target screen and electrostatically deflected into impingement with the phosphor or target screen. The operation and theory of the Aiken-type flat tube are described in greater detail in co-pending application No. 355,965, filed on May 19, 1953, now abandoned, in co-pending application No. 396,120, filed December 4, 1953, which issued on June 11, 1957, as Patent No. 2,795,731 and in co-pending application No. 521,201, filed July 11, 1955, now Patent No. 2,864,970. The theory of operation of an Aiken-type flat tube will be briefly described here in terms of the instant invention and reference is made to said co-pending application for a more specific description of the details of the structure and operation of such type tube. Although either the single or double-bend version of the Aiken-type flat tube could be used in the instant invention a double-bend version of the tube has been set forth in the following description of the instant invention.

As shown in FIGURE 1, the novel three-dimensional traffic control display unit 10 comprises a mounting chassis or base 11 and a transparent display section 14 which is joined with the base 11 to form a tube-like hermetically sealed structure for supporting and housing the operating components of the novel display device. The operating components include a plurality of electron guns 12 supported on one end of the chassis in vertically aligned, relatively spaced relation to deliver a plurality of electron beams which extend in spaced, parallel relation in a vertical plane which lies adjacent a plurality of vertically aligned primary deflection elements 15, it being understood that the terms "horizontal" and "vertical" are used herein in an exemplary fashion and are not to be considered limiting of the structure of the device.

The primary deflection elements 15 which are adjacent the path are, in effect, at right angles to the path of the beam output of each of the electron guns 12, and each of the deflection plates 15, as energized, is operative to bend the beam from such path at the point adjacent thereto and toward the display section 14. The operation of the primary deflection set is set forth in detail in the copending application, and reference is made thereto for a more detailed description thereof. Ostensibly, the display device may include a transition section (not shown) adjacent the primary deflection plates 15, if desired, such structure also being set forth in detail in the above-identified application.

The display section 14 comprises an outer housing including a plurality of transparent glass sides 14a, b, c and d and a base member 17 which may also be of a transparent material, the outer walls of the display section 14 being hermetically sealed with each other and the mounting chassis 11 to provide a single sealed structure. A plurality of transparent, solid surface, plates or shelves 16 are supported within the display section 14 in parallel spaced juxtaposed relation with each other, the plates being supported with the space or the zone between each pair of plates positioned relative to the beam output of a preassigned associated one of the electron guns 12 as the beam is deflected from its initial path by the primary deflection element 15 toward the display section 14.

As shown in more detail in the perspective illustration of FIGURE 2, one side of each plate 16 is coated with a transparent phosphor material to provide a target for an associated one of the electron beams, and the other side of each plate 16 is coated with a series of high voltage deflection strips 19. Thus each plate 16 supports a target 18 for one beam and a deflection set 19 for a second set. The use of solid surface structures obviously permits the display of information in different distinct planes, each of which is clearly distinguishable from the other.

The target 18 and the deflection strips 19 are of a transparent material to permit concurrent viewing of the information which is displayed on each of the different targets. As taught in the copending application, deflection strips of such type may be formed by painting strips of a solution of stannic chloride or other similar material on the one side of the plate member and baking the plates to form a set of conductive tin oxide deflection strips thereon.

For the purpose of simplifying the explanation of the design and operation of the embodiments set forth herewith in terms of the theory of the invention, the general description of the configuration and operation of the tube will be first explained with reference to one gun and its accompanying set of deflection means and target. With reference to the illustration of FIGURE 2, each electron gun 12, which is located at the left corner of the device, is adapted to deliver a beam along the left horizontal edge of the target 18 in a field-free region adjacent the primary deflection plates 15. Control means 26 apply electrostatic voltages in sequence to each of the primary deflection plates to effect bending of the beam horizontally at successive points along the edge of the target and into the second field-free region between the transparent flat secondary deflection plates 19 and the electrically charged target 18 which is associated therewith.

Deflection of the beam into registration with its associated screen is achieved by the application of voltages of appropriate values to corresponding ones of the secondary deflection plates 19. Thus, the position of each beam on its associated target may be controlled by the application of voltages to the corresponding ones of the primary and secondary deflection plates.

As shown in FIGURE 2 corresponding like secondary deflection plates 19 of each of the different sets for the different beams may be multiplied together, and since the primary deflection members 15 are disposed common to the beam outputs of each of the different electron guns, each of the beams will be controlled to register with a corresponding point on its associated target with the application of a given set of signals to the primary and secondary plates. Ostensibly, with the coupling of the output of a raster generator, such as 26, to the primary and secondary plates 15, 19, the several beams will be controlled to scan their associated targets in a related manner. Modulation of the different guns with correspondingly different discrete sets of information will effect the display of the different information sets on the different targets for simultaneous comparative viewing.

In the specific arrangement shown in FIGURE 2, each of the guns 12 is connected to a height analyzing unit 21 through a plurality of connections 22, shown in the drawing as a trunk cable. Height analyzing unit 21 is in turn connected to the radar transmitter and receiver station 23 through a plurality of connections shown as a trunk cable 24. The primary deflection plates 15 and the secondary deflection plates 19 are connected to raster generator 26. Raster generator 26 is connected through cables 27 to the radar transmitter and receiver 23.

In the operation of the device shown in FIGURE 2, radar signals are transmitted and received by the radar transmitte rand receiver station 23 through its associated antenna 25 in the conventional manner. Through the use of this equipment, both the altitude and the directional bearing of aircraft flying within the area of the station are obtained. The directional information is transmitted to the raster generator 26 which transforms this information into horizontal and vertical raster components and passes those signals to the primary and secondary deflection plates, respectively. Simultaneously, the altitude information signal from the radar station 23 is analyzed by height analyzing unit 21 converted into a signal consistent with one of the ranges encompassed by a particular electron gun and the signal showing an aircraft at that prescribed altitude is passed along to such gun. In this way, all aircraft flying within a certain altitude range will be shown on an associated target 18 of the device. For example, if there are four aircraft flying above the airport at altitudes of 20,000, 15,000, 10,000 and 5,000 feet, respectively, and if the ranges selected in the construction of the device are such that a separate gun and target combination is used for each altitude in 5,000 foot increments, then all four aircraft will be simultaneously shown, but each will be shown on a separate target 18 by impulses transmitted to a separate electron gun.

According to a further feature of the invention set forth in the embodiment of FIGURE 2, the bottom plate 17 of the device is treated with the tin conductive coating described hereinabove to form the first set of deflection plates 19. The bottom side of the second plate, which is coated with a transparent phosphor to form the target 18, is used to indicate all ground obstacles having an altitudes of less than 1,000 feet. Thus, as the radar antenna sweeps around and transmits its signal, these ground obstacles will be clearly shown in their proper location on the first target. Below the first target there is disposed the bottom plate 17, which on its lower side is painted to represent the geographical display of the local area. It is obvious that in place of paint, an aerial photograph or topographic map or slide projection of the area may be used to depict landscapes and to enable the radar operator to locate and reference the objects which he sees.

In the modification shown in FIGURE 3, the plates are arranged to give a two-color target image. In this device the glass shelves 36 are coated on both sides with a transparent phosphor film. A red transparent phosphor film is deposited on the top of each shelf 36 and a green transparent phosphor film is deposited on the bottom of each shelf 36. All alternate shelves 35 are coated on both sides with stannic chloride strips 19 and are placed between the target shelves 36. Associated with each pair of shelves 36 and 35 are two guns, 32R and 32G, which are individually connected not only to height analyzing unit 21, but also to a "Friend or Foe" codifying unit 34.

In operation, the radar signal is correlated with a code signal sent from the friendly aircraft and this signal, when passed to the unit 34, determines whether the red gun 32R or the green gun 32G will be triggered. In this fashion, all enemy aircraft will be shown in red while all friendly aircraft will be shown in green at each of the various altitude layers of the device.

In the device shown in FIGURE 4, the operation and construction are identical with the device shown in FIGURE 1 except that certain of the shelves 46 are painted on their lower side to indicate stationary obstacles. In addition, the phosphor coating is deposited in two contrasting colors so that surrounding said stationary obstacles for an area representing approximately one mile, a red transparent phosphor is used in contrast to the green transparent phosphor which is used throughout the general fields of the device. In this way, the obstacles are not only clearly shown by use of the paint on each of the target plates, but when an aircraft moves within dangerous range of a stationary object, the aircraft is displayed in a brilliant color in sharp contrast to the ordinary display used throughout the device. Thus, the attention of the radar operator is instantly called to the eminent danger and he can more quickly take steps to prevent a serious incident in flight. By way of further example, a phosphor capable of giving off a deep orange-red light could be used for this danger area while an ordinary pale green or white phosphor could be used for the remainder of the particular target shelf.

Other combinations and embodiments of the invention will be obvious to those skilled in the art to provide a multiplanar electron discharge display device operated in accordance with the invention set forth hereinabove and it is contemplated that the appended claims cover all such modifications as fall within the true spirit and scope of the invention.

What is claimed is:

1. A three-dimensional display device adapted to provide a visual presentation of the relative position and altitude of objects in a given volume comprising a plurality of transparent, solid-surface target members supported in juxtaposed relation to permit the concurrent viewing of the display on the lower target members through the target members which are disposed thereabove for comparison purposes, the solid surfaces of the different target members being supported in different planes to provide different planar displays for objects at different altitudes in said area, input means for said display device coupled to a signal source of a plurality of discrete signal sets, each of which signal sets indicates the relative position of each of the objects at a different one of said altitudes, and signal means coupled to said input means operative to energize said solid surfaces of the target members to display the relative positions of the objects in the area at each altitude, whereby a three-dimensional visual display of the position of the objects in different altitudes in a given volume is displayed on distinct and separate target surfaces which are disposed in non-planar, superposed relation with each other.

2. An electron space discharge device adapted to provide a visual presentation of the disposition of operating aircraft in a given area comprising a plurality of targets, each target having at least one display surface which is disposed to provide a visual display of the aircraft in a given altitude range, different target display surfaces being supported in different planes to provide displays in different planes for different altitude ranges, source means including primary deflection means for delivering an electron beam into a zone parallel and adajacent to each of said target display surfaces, secondary deflection means disposed adjacent each target display surface for deflecting the beam from the zone adjacent its target display surface into registration therewith, signal means for energizing said primary and secondary deflection means to effect a raster trace of the adjacent target display surface by the beam, and means for modulating the beam in its raster trace of the target display surface to provide an indication thereon of the position of the aircraft in the altitude range assigned to such target display surface.

3. A display system for providing a visual presentation of the relative position and altitude of operating aircraft in a given area comprising a plurality of light-transmitting, solid surface targets disposed in juxtaposed relation for concurrent viewing, each target having at least one solid display surface supported to provide a visual indication of the relative positions of the aircraft in a given area at a given altitude range, different target surfaces being disposed in different planes to provide correspondingly different planar displays for different altitude ranges, detector means for detecting the altitude and relative position of each aircraft in said area, and signal means operatively controlled by said detector means to energize each target display surface to display the relative positions of the aircraft at the altitude represented by such display surface, whereby a distinct and separate showing of the aircraft in each of a plurality of different altitude ranges are distinctly and separately displayed on non-planar, superposed target members in a three dimensional structure.

4. An electron space discharge device adapted to provide a visual presentation of information including at least the relative positions of mobile units in a given area comprising a plurality of light-transmitting, superposed non-planar target members, each target member being disposed to provide a visual indication of at least the relative positions of the mobile units in the area at a given altitude range, different target members being supported in different planes to provide a correspondingly different planar display of the relative positions of the mobile units in different altitude ranges, information representative means predisposed on each of said target members to represent at least the topography of the area at each of the altitudes represented thereby, input means for receiving signals representative of at least the altitude and position of the mobile units in the area, and signalling means coupled to said input means operatively controlled by said signals to selectively energize the different target members to display the position of the mobile units in each altitude range relative to each other and the predisposed information on the target member.

5. An electron space discharge device as set forth in claim 4 in which a first phosphor capable of emitting light of a first color is used on the target member within a given distance of the topography which is disposed thereon, and a phosphor capable of emitting light of a second color responsive to energization is utilized at other portions of the target member, whereby objects which move within a given distance of the topography thereon will appear in said first color to provide a warning display.

6. An electron space discharge device adapted to provide a visual presentation of the relative position of operating units of at least a first and a second class in a given volume comprising a plurality of target members, different target members being supported in different planes to provide different planar displays for different altitude ranges, at least one of said target members being disposed to provide a visual display of the units of the different classes in a given altitude range in different colors, including a first light-emitting means disposed on said one target member for displaying the units of said one class in a first color, and a second light-emitting means disposed on said one target member for displaying the units of said other class in a second color, input means for receiving signals representative of the altitude, class and relative positions of the units, and signal means coupled to said input means for selectively energizing said different target members to display the relative positions of the units at the altitudes represented thereby, and for energizing the first and second light emitting means to display, in the different colors, the position of the different classes of units which are at the altitude represented by said one target member.

7. An arrangement as set forth in claim 6 in which at least said one target member comprises a transparent plate having an electroluminescent material of one color on one side of said target member, and an electroluminescent material of a different color on a second side of said target member, and in which said signal means are operative to energize the electroluminescent material on the one side of the target member to display the relative positions of the units of the one class for the altitude range represented by the target member, and to energize the electroluminescent material on the second side of said target member to display the relative positions of the units of the second class in the same altitude range.

8. An electron space discharge device adapted to provide a visual presentation of the disposition of operating aircraft in a given area comprising a plurality of targets, each target having at least one display surface predisposed to provide a visual display of the aircraft in a given altitude range, the different target display surfaces being disposed in different planes to provide different planar displays for different altitude ranges, an electron gun for each target display surface including means for directing the beam of a gun into a zone parallel and adjacent to its associated target display surface, deflection means associated with each target display surface for deflecting its associated beam from said zone into registration with its target display surface, means for controlling the beam directing means and said deflection means to effect tracing of a raster on each of the target display surfaces by its associated beam, and means for modulating each of said beams to provide an indication on their target display surfaces of the position and altitude of the aircraft in the area.

9. An electron space discharge device adapted to provide a visual presentation of the disposition of operating aircraft in a given area comprising a plurality of targets, each target having at least one display surface disposed to provide a visual display of the aircraft in a given altitude range, different target display surfaces being supported in different planes to provide displays for different altitude ranges, an electron gun for each target display surface including means for directing the beam of each gun along a path parallel and adjacent to one edge of its associated target display surface, a first deflection means for deflecting the beam from said path into a zone adjacent its associated target display surface, a second deflection means associated with each target display surface for deflecting its associated beam from said zone into registration with said target display surface, means for controlling said first and second deflection means to effect tracing of a raster on its associated target display surface by each of said beams, and means for modulating the beams during the raster tracing operation to indicate the position and altitude of the aircraft in the area.

10. An arrangement as set forth in claim 9 in which the first deflection means comprises a set of common horizontal deflection strips connected to control deflection of each of the beams into the zones adjacent to their respective target display surfaces, and a common control means for energizing the second deflection means for each of the target display surfaces.

11. In an electronic display device for displaying different discrete sets of information, a plurality of at least partially transparent display members arrayed in justaposed relation for concurrent viewing, each of which is disposed in a different plane to display at least one different one of said discrete information sets on an area thereof, data representative means predisposed on each of said display members to represent certain existing conditions related to the information sets which are assigned for display on such member, input means for receiving signals representative of said discrete sets of information, and signalling means coupled to said input means operative to energize each of the different display members to display a different preassigned one of the discrete information sets, whereby information sets displayed on the different targets may be compared with the information which is predisposed on the different targets and with one another.

References Cited in the file of this patent

UNITED STATES PATENTS

| | | |
|---|---|---|
| 2,543,793 | Marks | Mar. 6, 1951 |
| 2,602,921 | Peters | July 8, 1952 |
| 2,762,031 | Fryklund | Sept. 4, 1956 |
| 2,859,438 | Reed | Nov. 4, 1958 |